(12) United States Patent
Itano et al.

(10) Patent No.: US 9,438,828 B2
(45) Date of Patent: Sep. 6, 2016

(54) PHOTOELECTRIC CONVERSION APPARATUS AND IMAGING SYSTEM USING THE SAME

(71) Applicant: CANON KABUSHIKI KAISHA, Tokyo (JP)

(72) Inventors: Tetsuya Itano, Sagamihara (JP); Kohichi Nakamura, Kawasaki (JP); Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/614,980

(22) Filed: Feb. 5, 2015

(65) Prior Publication Data

US 2015/0229832 A1    Aug. 13, 2015

(30) Foreign Application Priority Data

Feb. 10, 2014 (JP) ................. 2014-023367

(51) Int. Cl.
| H04N 5/355 | (2011.01) |
| H04N 5/345 | (2011.01) |
| H04N 5/347 | (2011.01) |
| H04N 5/3745 | (2011.01) |
| H04N 101/00 | (2006.01) |

(52) U.S. Cl.
CPC .......... H04N 5/35554 (2013.01); H04N 5/347 (2013.01); H04N 5/3456 (2013.01); H04N 5/3458 (2013.01); H04N 5/3745 (2013.01); H04N 2101/00 (2013.01)

(58) Field of Classification Search
CPC ...... H04N 5/343; H04N 5/347; H04N 5/378; G06G 7/14; G06G 7/16
See application file for complete search history.

(56) References Cited

U.S. PATENT DOCUMENTS

| 6,747,264 B2 | 6/2004 | Miida |
| 7,126,102 B2 | 10/2006 | Inoue et al. |

(Continued)

FOREIGN PATENT DOCUMENTS

| CN | 101668122 A | 3/2010 |
| JP | 2002320146 A | 10/2002 |

(Continued)

OTHER PUBLICATIONS

U.S. Appl. No. 14/591,168, filed Jan. 7, 2015.

(Continued)

*Primary Examiner* — Paul Berardesca
(74) *Attorney, Agent, or Firm* — Fitzpatrick, Cella, Harper & Scinto

(57) ABSTRACT

Provided is a photoelectric conversion apparatus including: a pixel array having pixels arranged in matrix; a pixel output line provided according to each column of the pixel array and transmitting a pixel signal output from a pixel of each column of the pixel array; a column signal processing unit provided according to each column of the pixel array and into which the pixel signal is input from the pixel output line, in which the column signal processing unit has a plurality of horizontal adding up or averaging units configured to add up or average the plurality of pixel signals based on the pixels of different columns of the pixel array; and a plurality of adding up or averaging modes with different numbers of columns subjected to adding up or averaging can be selected by selectively using one or a plurality of the plurality of horizontal adding up or averaging units.

12 Claims, 10 Drawing Sheets

(56) References Cited

U.S. PATENT DOCUMENTS

| | | |
|---|---|---|
| 7,154,075 B2 | 12/2006 | Krymski |
| 7,321,110 B2 | 1/2008 | Okita et al. |
| 7,408,210 B2 | 8/2008 | Ogura et al. |
| 7,460,162 B2 | 12/2008 | Koizumi et al. |
| 7,462,810 B2 | 12/2008 | Kobayashi et al. |
| 7,550,793 B2 | 6/2009 | Itano et al. |
| 7,573,037 B1 | 8/2009 | Kameshima et al. |
| 7,592,579 B2 | 9/2009 | Tamura et al. |
| 7,719,587 B2 | 5/2010 | Ogura et al. |
| 7,741,593 B2 | 6/2010 | Iwata et al. |
| 7,825,974 B2 | 11/2010 | Itano et al. |
| 7,920,192 B2 | 4/2011 | Watanabe et al. |
| 7,982,789 B2 | 7/2011 | Watanabe et al. |
| 7,990,440 B2 | 8/2011 | Kobayashi et al. |
| 8,023,025 B2 | 9/2011 | Itano et al. |
| 8,081,245 B2 | 12/2011 | Itano et al. |
| 8,085,319 B2 | 12/2011 | Ono et al. |
| 8,159,577 B2 | 4/2012 | Iwata et al. |
| 8,289,423 B2 | 10/2012 | Okuzaki et al. |
| 8,289,431 B2 | 10/2012 | Itano |
| 8,363,137 B2 | 1/2013 | Sonoda et al. |
| 8,400,546 B2 | 3/2013 | Itano et al. |
| 8,451,360 B2 | 5/2013 | Nakamura et al. |
| 8,598,901 B2 | 12/2013 | Hiyama et al. |
| 8,710,558 B2 | 4/2014 | Inoue et al. |
| 8,711,259 B2 | 4/2014 | Maehashi et al. |
| 8,736,725 B2 | 5/2014 | Ueda et al. |
| 8,835,828 B2 | 9/2014 | Kobayashi |
| 8,836,838 B2 | 9/2014 | Nakamura et al. |
| 8,866,948 B2 | 10/2014 | Yani |
| 8,884,391 B2 | 11/2014 | Fudaba et al. |
| 8,928,786 B2 | 1/2015 | Iwata et al. |
| 8,970,757 B2 | 3/2015 | Kobayashi |
| 9,029,752 B2 | 5/2015 | Saito et al. |
| 2009/0218476 A1 | 9/2009 | Kameshima et al. |
| 2010/0053397 A1 | 3/2010 | Yanai |
| 2012/0127352 A1 | 5/2012 | Fujimura et al. |
| 2012/0273657 A1 | 11/2012 | Kobayashi |
| 2013/0062503 A1 | 3/2013 | Saito et al. |
| 2013/0068930 A1 | 3/2013 | Nakamura et al. |
| 2013/0140440 A1 | 6/2013 | Kobayashi |
| 2014/0043511 A1 | 2/2014 | Iwata et al. |
| 2014/0253767 A1 | 9/2014 | Kato et al. |
| 2014/0312210 A1 | 10/2014 | Kobayashi |
| 2015/0021460 A1 | 1/2015 | Matsuda |
| 2015/0042857 A1 | 2/2015 | Kasusaki et al. |
| 2015/0077607 A1 | 3/2015 | Yamazaki et al. |

FOREIGN PATENT DOCUMENTS

| | | |
|---|---|---|
| JP | 2007050053 A | 3/2007 |
| JP | 2007-515869 | 6/2007 |
| JP | 2009105957 A | 5/2009 |
| JP | 2010-20037 | 1/2010 |
| JP | 2010062639 A | 3/2010 |
| JP | 2010074631 A | 4/2010 |
| JP | 2010-258828 | 11/2010 |
| JP | 2012-227695 | 11/2012 |
| WO | 2013/099264 | 7/2013 |

OTHER PUBLICATIONS

U.S. Appl. No. 14/591,180, filed Jan. 7, 2015.
U.S. Appl. No. 14/618,143, filed Feb. 10, 2015.
U.S. Appl. No. 14/663,592, filed Mar. 20, 2015.

US 9,438,828 B2

PHOTOELECTRIC CONVERSION APPARATUS AND IMAGING SYSTEM USING THE SAME

BACKGROUND OF THE INVENTION

1. Field of the Invention

The present invention relates to a photoelectric conversion apparatus and an imaging system using the same.

2. Description of the Related Art

Japanese Patent Application Laid-Open No. 2002-320146 describes that, in a photoelectric conversion apparatus, by adding up or averaging pixel signals included at least two columns of pixels and by outputting the result as an image signal of each pixel, skipping for reducing the number of signals to be read out is performed. In the above-described literature, a configuration in which a pixel mixing switch element for switching connection or disconnection is provided between inverting input terminals of operational amplifiers of at least two columns of amplifier circuits is described. By turning on the pixel mixing switch, the signals from at least two columns of pixels are added up or averaged. In this case, since the signal added up or averaged is output as a signal at a pixel position after skipping, a sampling frequency does not lower. Therefore, it is described that deterioration of resolution can be prevented, and occurrence of folding noises can be prevented, and a good quality image can be obtained.

However, a cycle of the adding up or averaging performed in the photoelectric conversion apparatus described in the Literature is singular, and a photoelectric conversion apparatus operating in a plurality of horizontal adding up or horizontal averaging modes with different adding up and averaging cycles is not discussed. If more pixel mixing switch elements for connecting or disconnecting a plurality of columns of amplifier circuits are added to the photoelectric conversion apparatus in the above-described Literature in order to realize the plurality of horizontal adding up or horizontal averaging modes with different adding up or averaging cycles, a circuit configuration and a layout of the amplifier circuit becomes complicated. In such a configuration, an image quality is expected to deteriorate due to an influence of crosstalk.

SUMMARY OF THE INVENTION

A photoelectric conversion apparatus according to the present invention includes a pixel array in which a plurality of pixels are arranged in matrix, a pixel output line provided in each column of the pixel array and transmitting a pixel signal output from the pixel in each column of the pixel array, and a column signal processing unit provided in each column of the pixel array and to which the pixel signal is input from the pixel output line, in which each of the column signal processing unit has a plurality of horizontal adding up or horizontal averaging units for adding up or averaging the plurality of pixel signals based on different columns of pixels in the pixel array. A plurality of adding up or averaging modes with different numbers of columns to be added up or averaged can be selected by selectively using one or more of the plurality of horizontal adding up or horizontal averaging units.

Further features of the present invention will become apparent from the following description of exemplary embodiments with reference to the attached drawings.

DESCRIPTION OF THE EMBODIMENTS

Figure 1:
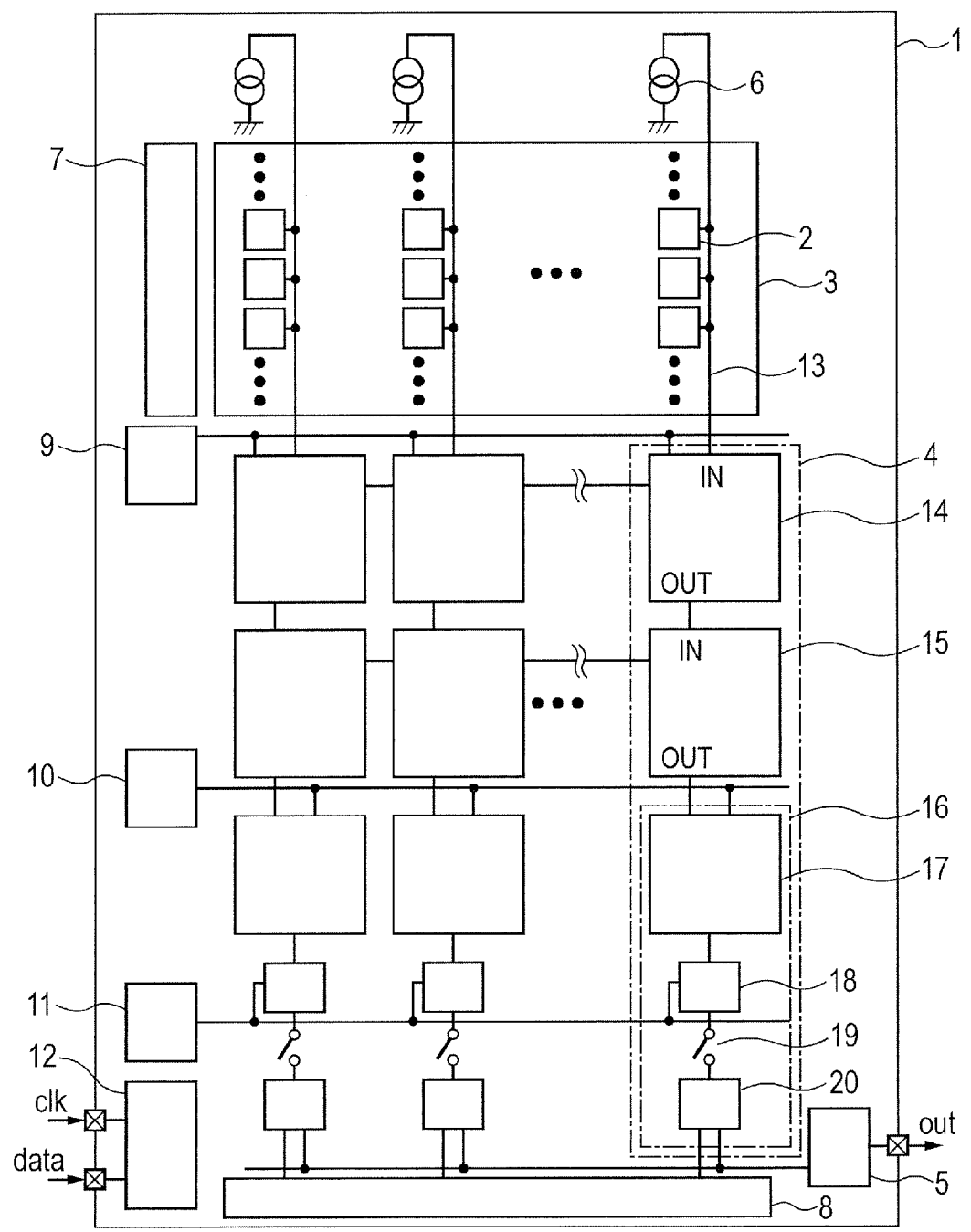
FIG. 1 is a block diagram illustrating a configuration of a photoelectric conversion apparatus.

Preferred embodiments of the present invention will now be described in detail in accordance with the accompanying drawings. The same constituent elements are given the same reference numerals throughout the drawings, and description might be omitted for duplicated constituent elements.

First Embodiment

Configuration of Photoelectric Conversion Apparatus

FIG. 1 is a block diagram illustrating a configuration of a photoelectric conversion apparatus 1 according to a first embodiment. The photoelectric conversion apparatus 1 includes a pixel array 3 in which a plurality of pixels 2 are arranged in matrix, a column signal processing unit 4, a data output unit 5, and a load current source 6 connected to each column of the pixels 2. The photoelectric conversion apparatus 1 has the column signal processing units 4. The pixel array 3 is arranged between the signal processing units 4, in a column direction of the pixel array 3. However, FIG. 1 is a drawing with omission in which the column signal processing unit 4 is arranged only in the lower direction of the pixel array 3. The upper direction or the lower direction in this description only refers to an upper part or a lower part on the figure which is a plane schematic view and does not mean to limit an upper/lower direction in an actual element layout. Moreover, a horizontal direction and a vertical direction in this description mean a row direction and a column direction in the pixel array 3, respectively.

The photoelectric conversion apparatus 1 further includes a vertical scanning unit 7 for controlling an operation of the pixel 2 by the unit of rows, a horizontal scanning unit 8 for selecting a column from which the signal is to be read out, a standard voltage generating unit 9, a reference signal generating unit 10, a count unit 11, and a timing control unit 12. The pixel 2 in each column is connected to the column signal processing unit 4 and the load current source 6 through the pixel output line 13. The load current source 6 supplies electric power for operating the pixel 2. The pixel 2 transmits a noise voltage at reset or a pixel signal voltage through the pixel output line 13 and outputs it to the column signal processing unit 4.

Each of the column signal processing units 4 includes an amplification unit 14, a holding unit 15, and an AD conversion unit 16. The signal input from the pixel output line 13 into the column signal processing unit 4 is amplified by the amplification unit 14 and is held by the holding unit 15. An output of the holding unit 15 is connected to the AD (Analog-to-Digital) conversion unit 16. The standard voltage generating unit 9 supplies a standard voltage to the amplification unit 14.

The AD conversion unit 16 includes a comparing unit 17, a write memory 18, an inter-memory transfer switch 19, and a read memory 20. The comparing unit 17 receives inputs of a reference signal supplied from the reference signal generating unit 10 and the output of the holding unit 15 and outputs a comparison result as a voltage signal. The reference signal is a constant voltage signal or a ramp signal in which a voltage monotonously increases or decreases with elapse of time. The count unit 11 outputs a count value changing with time as a count signal to each of the write memories 18. When a magnitude relation of the reference signal input into the comparing unit 17 and the output signal of the holding unit 15 is inverted, a logic level (high level or low level) of the output is inverted. When the logic level of the output of the comparing unit 17 is inverted, the write memory 18 holds the count signal supplied from the count unit 11 at that point of time. In this way, the comparing unit 17 AD-converts the input signal which is an analog signal to digital data.

The count signal held in the write memory 18 is transferred to the read memory 20 through the inter-memory transfer switch 19. When a column is selected by the horizontal scanning unit 8, the signal held by the read memory 20 of that column is transmitted to the data output unit 5 and is output from the photoelectric conversion apparatus 1. In this embodiment, the write memory 18 and the read memory 20 are assumed to have a configuration capable of independently holding two types of digital data, respectively.

The timing control unit 12 receives a clock signal (clk) and communication data (data) from an outside and transmits/receives each of control signals for controlling an operation of each block provided in the photoelectric conversion apparatus 1. The operation includes a selection of operation modes.

(Configuration of Pixel)

Figure 2:
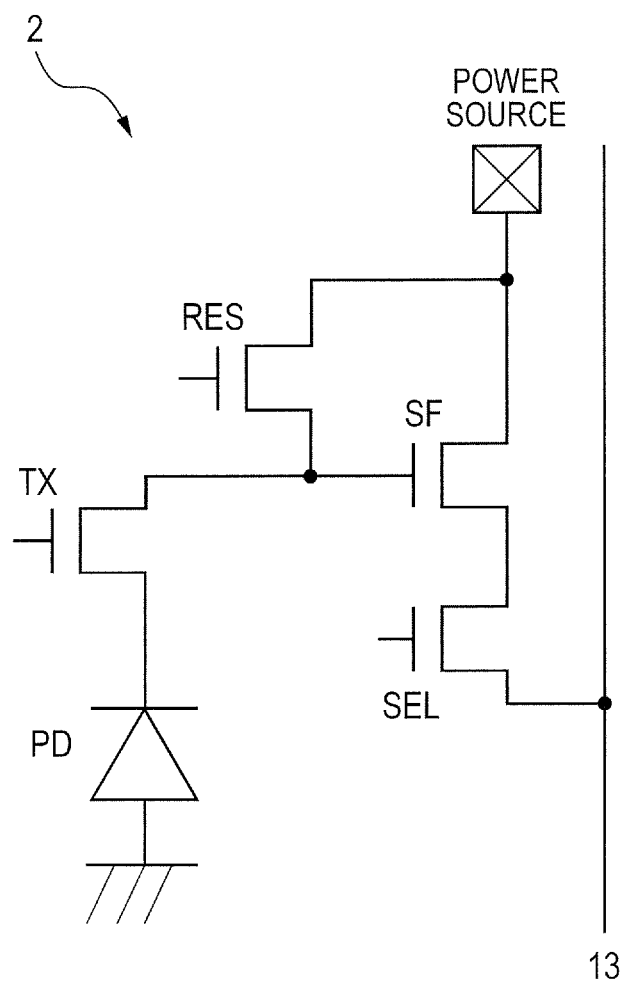
FIG. 2 is an equivalent circuit diagram illustrating a configuration of a pixel.

FIG. 2 is an equivalent circuit diagram for describing a configuration example of the pixel 2. The pixel 2 includes a photodiode PD as a photoelectric conversion unit, a transfer transistor TX, a source follower transistor SF, a reset transistor RES, and a select transistor SEL. Each of the transistors includes an N-channel type MOS transistor and functions as a switch or an amplifier.

The photodiode PD generates a charge by photoelectric conversion. When the transfer transistor TX is turned on, the generated charge is transferred to a gate node of the source follower transistor SF. When the select transistor SEL is turned on, the source follower transistor SF operates as a source follower circuit together with the load current source 6, and an output voltage according to a charge amount transferred to the gate node appears on the pixel output line 13. The reset transistor RES is connected between a gate node of the source follower transistor SF and the load current source 6. When the reset transistor RES is turned on, the gate node of the source follower transistor SF is reset to a power source voltage.

(Configuration of Amplification Unit)

Figure 3:
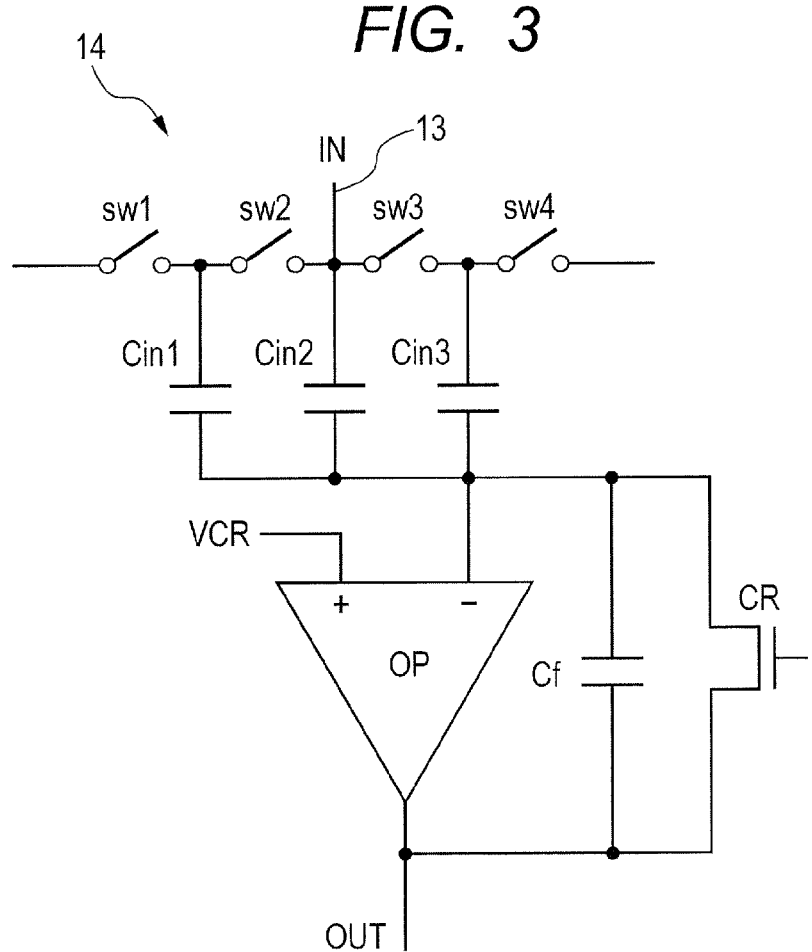
FIG. 3 is an equivalent circuit diagram illustrating a configuration of an amplification unit.

FIG. 3 illustrates an equivalent circuit diagram of an inversion amplification circuit using a differential amplifier which is an example of a configuration of the amplification unit 14. For the differential amplifier, an operational amplifier, for example, can be used. The inversion amplification circuit in FIG. 3 includes a differential amplifier OP, switches sw1 to 4, input capacitors Cin1 to 3, a feedback capacitor Cf, and a feedback switch CR. To an input terminal IN, the pixel output line 13 is connected. An output terminal OUT is connected to an input terminal of the holding unit 15.

A standard voltage VCR generated in the standard voltage generating unit 9 is input into a non-inverting input terminal of the differential amplifier OP, while one of nodes of the input capacitors Cin1 to 3, one of nodes of the feedback capacitor Cf, and one of nodes of the feedback switch CR are connected to an inverting input terminal. The other node of the input capacitor Cin1 is connected to the pixel output line 13 through the switch sw2 and is further connected to the amplification unit 14 of the adjacent pixel column through the switch sw1. The other node of the input capacitor Cin2 is connected to the pixel output line 13. The other node of the input capacitor Cin3 is connected to the pixel output line 13 through the switch sw3 and is further connected to the amplification unit 14 of an adjacent pixel column through the switch sw4. However, the switch sw4 is the same as the switch sw1 of the amplification unit 14 of an adjacent pixel column. In FIG. 3, description of the pixel output line of the adjacent pixel column is omitted.

In this circuit configuration, by executing control so as to turn on (to connect) or off (to disconnect) the switches sw1 and sw2, the pixel output line 13 to which the input capacitor Cin1 is connected can be switched. Moreover, by executing control so as to turn on or off the switches sw3 and sw4, the pixel output line 13 to which the input capacitor Cin3 is connected can be also switched. By switching these switches, switching between a horizontal adding up or horizontal averaging mode for performing adding up or averaging between pixel columns and a non-adding mode for not performing adding up or averaging is realized.

The other nodes of the feedback capacitor Cf and the feedback switch CR are both connected to an output terminal of the differential amplifier OP and constitute the output terminal OUT of the amplification unit 14. According to this configuration, an amplification rate of the amplification unit 14 is determined by a ratio of a sum of those connected to the input terminal IN in the capacity values of the input capacitors Cin1 to 3 to a capacity value of the feedback capacitor Cf. Moreover, according to the configuration of the illustration, correlated double sampling processing for reducing a noise generated in the pixel 2 can be executed. In this configuration, in the horizontal adding up or horizontal averaging mode, by turning on the switches sw1 and sw4, adding up or averaging of horizontal three columns can be performed by using the input capacitors Cin1 to 3. In the non-adding up or non-averaging mode, by turning off the switches sw1 and sw4, only a signal from the pixel corresponding to the column signal processing unit 4 can be read out without performing adding up or averaging with the adjacent column.

(Adding Up or Averaging in Amplification Unit)

Description will be made by using FIG. 4 which is an example of the adding up or averaging realized by this configuration. In this description, the term "adding up or averaging" is assumed to include "adding" in which a level of a signal obtained by the adding up or averaging becomes larger than each of the plurality of signals offered for the adding up or averaging and "averaging" in which a plurality of signal levels offered for the adding up or averaging are averaged. Moreover, in this description, the term "adding up or averaging" include both a case of weighting on the element subjected to the adding up or averaging and a case of not weighting and is not limited to the meaning of simple averaging. Furthermore, adding up or averaging with weighting is referred to as weighted adding up or weighted averaging, while adding up or averaging without weighting is referred to as non-weighted adding up or non-weighted averaging. When signals from the plurality of pixel output lines 13 are input into one amplification unit 14 through the input capacitors Cin1 to 3, it is weighted adding up or weighted averaging if the capacity values connected in series to the pixel output lines 13, respectively, are made different, while it is non-weighted adding up or non-weighted averaging if they are matched.

Figure 4:
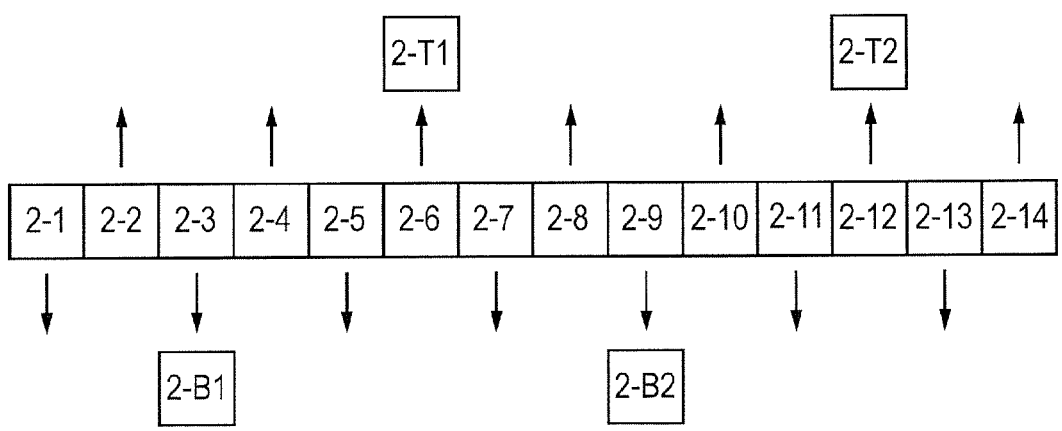
FIG. 4 is a view for describing non-weighted adding up or non-weighted averaging.

FIG. 4 is a view for describing the non-weighted adding up or non-weighted averaging of a horizontal 3-column cycle. In FIG. 4, squares indicated by 2-1 to 14 represent 14 adjacent pixels in the same row in the pixel array 3. Moreover, upward or downward arrows illustrated with each of pixels 2-1 to 14 mean that the column signal processing unit 4 is connected in a direction of this arrow. That is, the column signal processing unit 4 arranged at the lower side of the pixel array is electrically connected to the odd numbered pixels 2-1, 2-3, . . . 2-13. The column signal processing unit 4 arranged at the upper side of the pixel array is electrically connected to the even numbered pixels 2-2, 2-4, . . . 2-14. Each of the pixels 2-1 to 14 is provided with a color filter in one of colors red (R), green (G), and blue (B). The color filter selectively transmits light with a specific wavelength in the light incident into the photodiode PD. As a result, the pixel signal including color information is obtained.

The pixels 2-1, 3, 5, 7, 9, 11, and 13 are pixels provided with the color filters in the same color (R, for example), and the signal output from the pixel is read out through the column signal processing unit 4 arranged in the lower direction of the pixel array 3 illustrated in FIG. 1. The pixels 2-2, 4, 6, 8, 10, 12, and 14 are provided with the color filters in the same color (G, for example) and different from that of the pixels 2-1, 3, 5, 7, 9, 11, and 13. The signals output from the pixels 2-1, 3, 5, 7, 9, 11, and 13 are read out through the column signal processing unit 4 arranged in the upper direction.

By subjecting the signal corresponding to the pixels 2-1, 3, and 5 to non-weighted adding up or non-weighted averaging with the above-described method, a signal having a position of 2-B1 in FIG. 4 as the spatial weighted center in the horizontal direction (hereinafter referred to as the weighted center) is obtained. Similarly, signals having positions 2-B2, 2-T1, and 2-T2 as the weighted center in the horizontal direction are obtained by adding up or averaging. Assuming that the color of the color filter of the odd-numbers pixels is R and the color of the even-numbered color filter is G as described above, 2-B1 and 2-B2 correspond to adding up or averaging of the pixel in R, and 2-T1 and 2-T2 correspond to adding up or averaging of the pixel in G. Thus, since it is the adding up or averaging such that the weighted centers of the signals in each color are arranged uniformly, a false color is suppressed. The "weighted center" in this description means a position obtained by applying the weighted adding up or weighted averaging of the position of the signal (coordinate) used in the weighted adding up or weighted averaging at the same ratio. The weighted center in 1:2 weighted adding up or weighted averaging of the X-th pixel and the Y-th pixel is (X+2·Y)/3, for example.

(Configuration of Holding Unit)

Figure 5:
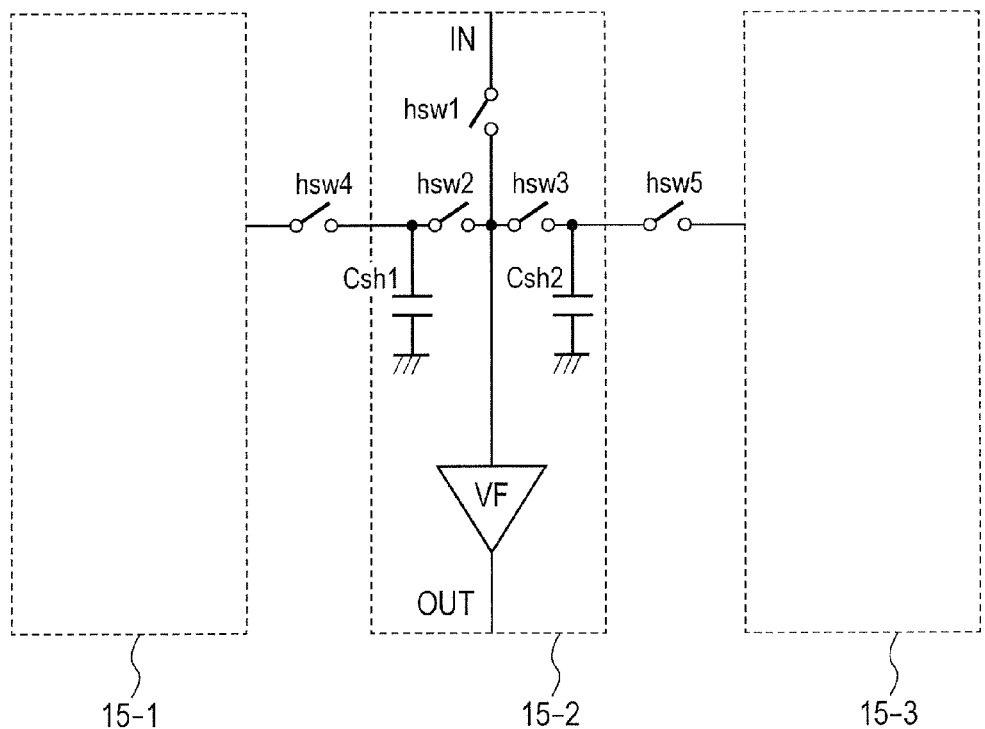
FIG. 5 is an equivalent circuit diagram illustrating a configuration of a holding unit.

FIG. 5 is a view illustrating a configuration of the holding unit 15. Only three columns in the plurality of holding units 15 are extracted and exemplified, and they are referred to as the holding units 15-1, 15-2, and 15-3, respectively. Moreover, since the configuration of the holding unit in each column is the same, a detailed circuit is illustrated only for the holding unit 15-2. Only frame lines indicating the holding units are illustrated for the holding units 15-1 and 15-3. Though illustration is omitted in FIG. 5, the holding units 15-1 and 15-3 also have switches hsw5 and hsw4 provided between them and another holding unit located on sides opposite to the holding unit 15-2, respectively. Each of the holding units 15-2 includes the switches hsw1 to hsw3, holding capacitors Csh1 and Csh2, and a voltage follower VF. Moreover, the switch hsw4 is provided between the holding unit 15-1 and the holding unit 15-2, and the switch hsw5 is provided between the holding unit 15-2 and the holding unit 15-3, respectively. In other words, the switches hsw4 and hsw5 are shared by the adjacent column signal processing units.

In the holding unit 15-2, the input terminal IN is connected to the holding capacitor Csh1 through the switch hsw1 and the switch hsw2 and is connected to the holding capacitor Csh2 through the switch hsw1 and the switch hsw3. That is, the holding capacitors Csh1 and Csh2 are connected to the holding capacitor of the holding unit included in the adjacent column signal processing units through the switch hsw4 and the switch hsw5, respectively. As described above, each of the holding units 15 is connected to the adjacent holding unit through the switch.

The output terminal of the amplification unit 14 is connected to the input terminal IN. The signals held in the holding capacitors Csh1 and Csh2 are connected to the comparing unit 17 at the output terminal OUT via the voltage follower VF.

(Adding Up or Averaging in Holding Unit)

Figure 6:
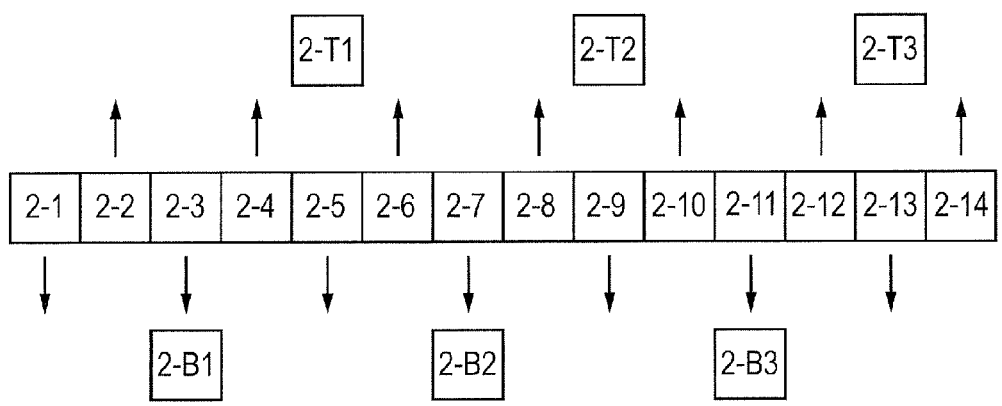
FIG. 6 is a view for describing weighted adding up or weighted averaging.

An example of the weighted adding up or weighted averaging realized by the configuration of the holding unit 15 illustrated in FIG. 5 will be described in FIG. 6. FIG. 6 is a view for describing the weighted adding up or weighted averaging of a horizontal 2-column cycle.

In FIG. 6, squares indicated by 2-1 to 14 represent 14 adjacent pixels in the same row in the pixel array 3. Since the column signal processing unit 4 for arranging the color filter of each pixel and for reading out is the same as in FIG. 4, detailed description will be omitted.

It is assumed that the holding units corresponding to the pixels 2-1, 2-3, and 2-5 of the column signal processing unit 4 arranged in the lower direction are holding units 15-1, 15-2, and 15-3 illustrated in FIG. 5. At this time, the holding capacitor Csh2 of the holding unit 15-1 and the holding capacitor Csh1 of the holding unit 15-2 are connected through the switch hsw4. The holding capacitor Csh2 of the holding unit 15-2 and the holding capacitor Csh1 of the holding unit 15-3 are connected through the switch hsw5.

Subsequently, driving of each of the switches when adding up or averaging is to be performed will be described. First, the switches hsw1, 2, and 3 of all the holding units are turned on, and the output voltage of the amplification unit 14 is applied to the holding capacitors Csh1, and 2. Subsequently, the switches hsw1 of all the holding units are turned off, and the charge according to the applied voltage signal is held by the holding capacitors Csh1 and Csh2. After that, the switches hsw4 and hsw5 are turned on. At this time, the voltage of each of the holding capacitors Csh1 and 2 corresponding to the pixels 2-1, 2-3, and 2-5 becomes the same by movement of the held charge, and the signal is subjected to adding up or averaging.

In this case, the weighted adding up or weighted averaging that a ratio of the number of the holding capacitors to be connected to the holding units 15-1, 15-2, and 15-3 is 1:2:1 is realized. Thus, the weighted center of the signal in the horizontal direction becomes the position of 2-B1 in FIG. 6 which is matched with the position of the holding unit 15-2. By the similar operation, signals having the weighted centers in the horizontal direction at the positions of 2-B2 and 2-B3 are obtained.

The holding units corresponding to the pixels 2-4 and 2-6 of the column signal processing unit arranged in the upper direction are assumed to be the holding units 15-1 and 15-2. That is, in FIG. 5, assume a case in which the switch hsw5 is OFF at all times and the holding unit 15-3 is not connected. The holding capacitor Csh2 of the holding unit 15-1 and the holding capacitor Csh1 of the holding unit 15-2 are connected through the switch hsw4. First, the switches hsw1, 2, and 3 of all the holding units are turned on, and the output voltage of the amplification unit 14 is applied to the holding capacitors Csh1 and 2. Subsequently, the switches hsw1 of all the holding units are turned off, and the charge according to the applied voltage signal is held in the holding capacitors Csh1 and 2. After that, by turning on the switch hsw4 and the switches hsw2 and 3 of the holding unit 15-1 and the holding unit 15-2, the signals of the holding units corresponding to the pixels 2-4 and 6 are subjected to adding up or averaging. In this case, the ratio of the number of holding capacitors to be connected is 2:2 to the holding units 15-1 and 15-2. Thus, the weighted center of the signal in the horizontal direction is at the position of 2-T1 in FIG. 6 matching the position of the pixel 2-5. By the similar operation, signals having the positions of 2-T2 and 2-T3 as the weighted centers in the horizontal direction are obtained.

Assuming that the odd-numbered pixel is R and the even-numbered pixel is G, 2-B1, B2, and B3 correspond to adding up or averaging of the pixels in R, and 2-T1, T2, and T3 correspond to adding up or averaging of the pixels in G. Thus, since the adding up or averaging is performed such that the weighted centers of the signals are uniformly arranged in each color, a false color is suppressed.

(Configuration of Comparing Unit)

Figure 7:
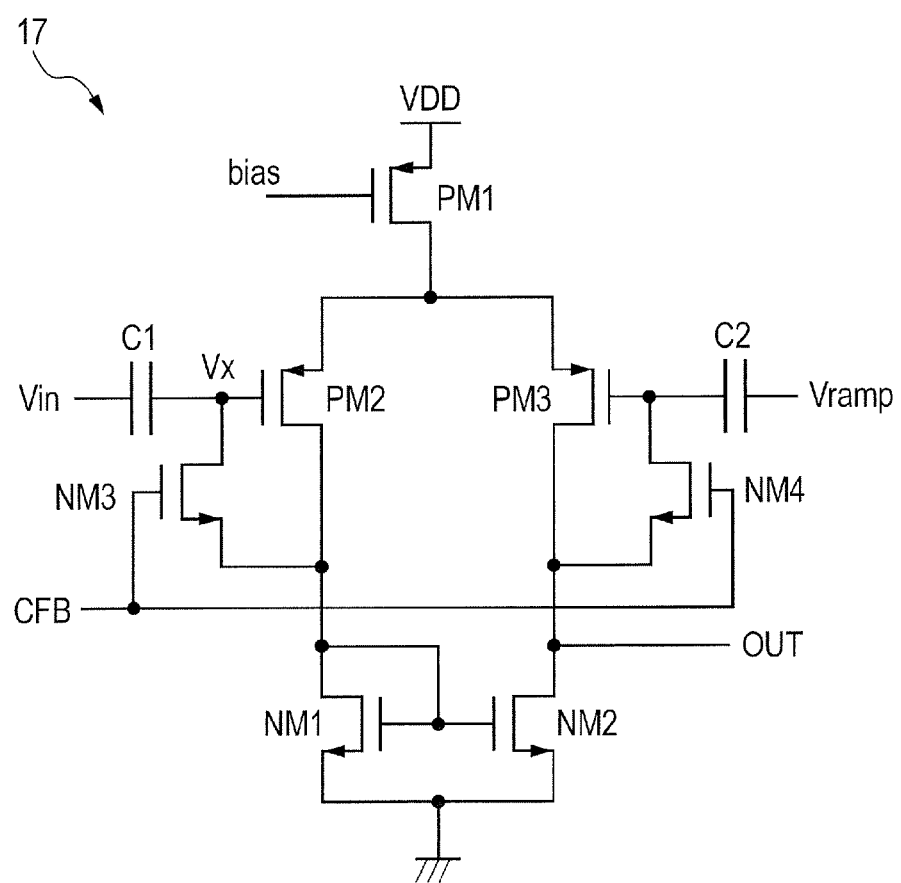
FIG. 7 is an equivalent circuit diagram illustrating a configuration of a comparing unit.

FIG. 7 illustrates a comparator using a differential amplification circuit as an example of a configuration of the comparing unit 17. Transistors PM1, PM2, and PM3 in the figure are P-channel type MOS transistors, and transistors NM1, NM2, NM3, and NM4 are N-channel type MOS transistors.

A gate of the transistor PM1 is connected to a node supplying a bias voltage (bias), and a source of the transistor PM1 is connected to a node supplying a power source voltage VDD. As a result, the transistor PM1 functions as a current source. The transistors PM2 and PM3 are input transistors of the differential amplifier. The sources of the transistors PM2 and PM3 are connected to a drain of the transistor PM1. Drains of the transistors PM2 and PM3 are connected to sources of the transistors NM1 and NM2, respectively.

Reference characters NM1 and NM2 constitute a current mirror circuit. That is, gates of the transistor NM1 and the transistor NM2 are connected to each other, and a source and the gate of the transistor NM1 are short-circuited. The transistors NM3 and NM4 function as switches for short-circuiting the gates and the drains of the transistors PM2 and PM3 which are the input transistors based on a signal CFB.

The output terminal OUT of the holding unit is connected to an input terminal Vin of the comparing unit 17 and is connected to the differential amplification circuit at a node Vx through a clamp capacitor C1. A reference signal is given to an input terminal Vramp of the comparing unit 17 and is connected to the differential amplification circuit through a clamp capacitor C2. An output terminal OUT of the comparing unit 17 is connected to an interconnect between the drain of the transistor PM3 and the source of the transistor NM2. Capacitors such as an input capacitor of the amplification unit 14, a holding capacitor of the holding unit 15, a clamp capacitor of the comparing unit 17 can be constituted by using a PN junction or a MOS structure, or a parasitic capacitance between interconnects may be used.

(Timing Chart of Operation of Photoelectric Conversion Apparatus)

Figure 8:
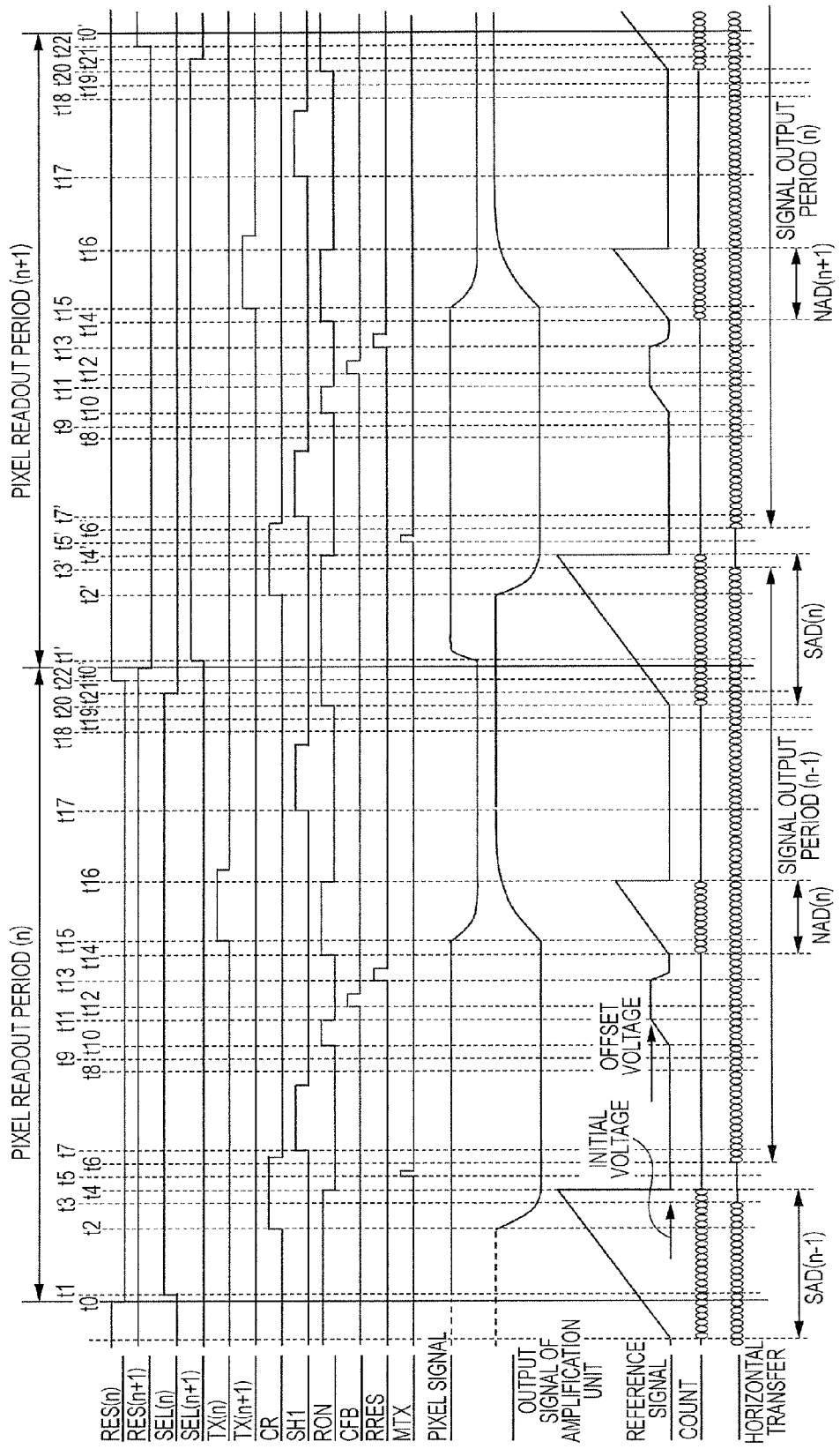
FIG. 8 is a timing chart for describing an operation of the photoelectric conversion apparatus.

FIG. 8 is a timing chart for describing an operation of the photoelectric conversion apparatus. In FIG. 8, an operation relating to the pixel 2 on the n-th row (n is an integer of 1 or more) and the (n+1)-th row in the pixel array 3 is illustrated. Signals RES (n), SEL(n), and TX(n) indicate signals given to gates of the reset transistor RES, the select transistor SEL, and the transfer transistor TX of the pixel 2 on the n-th row, respectively. The same applies to the signals RES(n+1), SEL(n+1), and Tx(n+1). These signals are supplied from a vertical scanning unit 7.

The signal CR is a signal for controlling the feedback switch CR of the amplification unit 14. A signal SH1 is a signal for controlling the switch hsw1 of the holding unit 15. A signal RON is a signal for controlling the reference signal generating unit 10, and the reference signal changes at the time of high level. The signal CFB is a signal for controlling the transistors NM3 and NM4 which are a NMOS of the comparing unit 17 and is a control signal for executing initial reset of the comparing unit 17. A signal RRES is a signal for resetting the reference signal to a start voltage of a ramp signal at the time of high level in the reference signal generating unit 10. A signal MTX is a signal for controlling a conduction state of the inter-memory transfer switch 19. When each signal is at a high level, the corresponding transistor or switch is assumed to be turned on.

Lines on stages of a "pixel signal", an "output signal of amplification unit" and a "reference signal" indicate voltages of signals output from the pixel 2, the amplification unit 14, and the reference signal generating unit 10, respectively. White circles on the stages of a "count" and a "horizontal transfer" indicate periods in which the count and the horizontal transfer are performed, respectively.

A signal output operation from the pixel 2, amplification of the signal output from the pixel 2 in the amplification unit 14, a holding operation of the output of the amplification unit 14, an AD conversion operation, and a signal output operation from the read memory 20 in this embodiment will be described. The number or a ratio of pixel output lines contributing to the adding up or averaging can be selected by changing switching timing of the switch in this embodiment. That is, the column signal processing unit 4 according to this embodiment has a plurality of horizontal adding up or horizontal averaging units for subjecting the plurality of pixel signals to the adding up or averaging. As a result, the adding up or averaging can be performed by selectively using a plurality of modes. Alternately, it is possible not to perform adding up or averaging (non-adding up or non-averaging mode). An operation of the non-adding up or non-averaging mode, an operation of the horizontal 3-column cycle non-weighted adding up or non-weighted averaging mode in the amplification unit, and an operation of the horizontal 2-column cycle adding up or averaging mode in the holding unit will be described below in order.

(Operation of Non-Adding Up or Non-Averaging Mode)

Description will be made by referring to the timing chart in FIG. 8. In the non-adding up or non-averaging mode, the switches sw1 and sw4 of the amplification unit are off. The switches sw2 and sw3 are assumed to be on. The switches hsw2 and hsw3 of the holding unit are on. The switches hsw4 and hsw5 of the holding unit are off. By turning either one or the both of the switches sw2 and sw3 off, the amplification rate of the amplification unit 14 can be changed. In this case, the operation in the non-adding up or non-averaging mode is the same.

A period from time t0 to time t0' in FIG. 8 is a pixel readout period (n). In this period, an analog signal relating to the pixel on the n-th row is held in the holding capacitors Csh1 and Csh2 of the holding unit 15.

At the time t0, when a signal RES(n) is switched from a high level to a low level, a reset transistor RES of the pixel 2 on the n-th row is turned off. As a result, a reset state of the source follower transistor SF is released.

At time t1, a signal SEL(n) rises to a high level, and a select transistor SEL of the pixel 2 on the n-th row is turned on. As a result, a signal corresponding to the reset of the gate node of the source follower transistor SF of the pixel 2 on the n-th row is output to the pixel output line 13. This output signal includes a noise generated when the reset transistor RES is turned off and a noise caused by the source follower transistor SF. Hereinafter, this output signal will be referred to as an N signal.

Starting at time t2, the signal CR of the amplification unit 14 temporarily rises to a high level. As a result, the amplification unit 14 operates as a voltage follower, and the N signal of the pixel on the n-th row output to the pixel output line 13 at this time is held in the input capacitors Cin1 to 3.

After the signal CR falls to a low level, a signal SH1 of the switch hsw1 temporarily rises to a high level starting at time t7, and an output of the amplification unit 14 is held in the holding capacitors Csh1 and 2. The signal held in the holding capacitors Csh1 and 2 by the operation starting at the time t7 becomes a signal corresponding to an offset voltage of the differential amplifier OP of the amplification unit 14. In a period NAD(n) from time t14 to time t16, the offset voltage component of the amplification unit 14 is converted to a digital signal. In this period, the holding capacitors Csh1 and 2 are electrically disconnected from the amplification unit 14 by the switch hsw1.

In a period from time t10 to t11, the signal RON rises to a high level, and a reference signal changes and is set to the offset voltage. Starting at time t12, the signal CFB temporarily rises to a high level, and the transistors NM3 and NM4 are turned on. As a result, a voltage is held in the clamp capacitors C1 and C2 so that the offset voltage is cancelled, and the input and output terminals of the comparator have substantially the same voltage.

After that, the signal RRES temporarily rises to a high level starting at time T13, and the reference signal changes and is reset to a start voltage. The signal RON rises to a high level starting at time t14, and a change of the reference signal is started. On the other hand, with the change start of the reference signal, the count unit 11 starts counting. When a magnitude relation between the temporally changing reference signal and the output of the holding unit is inverted, the count value of the count unit 11 at that point of time is held in the write memory 18.

When a signal TX(n) temporarily rises to a high level starting at time t15, a charge accumulated in the photodiode PD of the pixel 2 on the n-th row by photoelectric conversion is transferred to the gate node of the source follower transistor SF by that time. A potential of the pixel output line 13 varies according to a transferred charge amount. The potential of the pixel output line 13 at this time corresponds to a sum of a signal according to the charge amount generated by the photodiode PD by photoelectric conversion (hereinafter referred to as an S signal) and the N signal output from the pixel 2 at the time t1. Hereinafter, this signal will be referred to as an (S+N) signal.

When the (S+N) signal of the pixel on the n-th row is output to the pixel output line 13, the amplification unit 14 outputs a signal obtained by amplifying a varied portion based on the N signal, that is, a component corresponding to the S signal. After the signal TX(n) falls to a low level, the signal SH1 temporarily rises to a high level starting at the time t17, and the output of the amplification unit 14 is held in the holding capacitors Csh1 and 2. After the output of the amplification unit 14 is held in the holding capacitors Csh1 and 2, the signal SEL(n) falls to a low level at time t21, and the select transistor SEL of the pixel 2 on the n-th row is turned off. When the signal RES(n) is switched from the low level to the high level at time t22, the reset transistor RES of the pixel 2 on the n-th row is turned on. As a result, the source follower transistor SF enters a reset state.

On the other hand, the signal held in the holding capacitors Csh1 and 2 by the operation from the time t17 is a signal in which the signal obtained by amplifying the S signal of the pixel 2 on the n-th row is superposed with the offset voltage component of the differential amplifier OP of the amplification unit 14. This signal is converted to a digital signal in a period from the time t20 to time t4' (period SAD(n)). In this period, the holding capacitors Csh1 and 2 are electrically disconnected from the amplification unit 14 by the switch hsw1. Starting at the time t20, the signal RON rises to a high level, and a change of the reference signal is started. If the magnitude relation between the temporally changing reference signal and the output of the holding unit 15 is inverted, the count value of the count unit 11 at that point of time is held in the write memory 18.

After the AD conversion operation periods NAD(n) and SAD(n) corresponding to read-out of the N-th line, the signal MTX rises to a high level at t5' of the pixel readout period (n+1). As a result, the inter-memory transfer switch 19 is turned on, and the two digital signals held by the write memory 18 during the period NAD(n) and the period SAD(n) are transferred to the read memory 20. From time t6' of the pixel readout period (n+1) to time t3" of the pixel readout period (n+2) (not shown), horizontal transfer in which these signals are transferred from the read memory 20 to the data output unit 5 is performed. Then, an output is made from the data output unit 5 to an apparatus outside the photoelectric conversion apparatus 1.

In the data output unit 5 or a signal processing unit, not shown, provided on its subsequent stage, correlated double sampling processing for reducing the offset voltage by obtaining a difference between the digital signals obtained in the period NAD(n) and the period SAD(n) is executed. As a result, a digital signal in which the offset component of the differential amplifier OP of the amplification unit 14 is reduced can be obtained.

According to this embodiment, a signal is amplified by providing the amplification unit 14 on a foregoing stage of the holding unit 15. As a result, since amplification is performed before the noise caused by holding of the signal by the holding unit 15 is superposed, an S/N ratio of the obtained signal can be improved. That is, in order to have the amplification rate of the amplification unit 14 at 1 time or more, each of the input capacitors Cin1 to 3 and the feedback capacitor Cf of the amplification unit 14 preferably have a relation of (Cin1+Cin2+Cin3)>Cf. Moreover, Cin2>Cf is more preferable since the similar effect can be obtained even if the switches sw1 and sw2 are turned off. The higher the amplification rate of the amplification unit 14 is, the more the influence of the noise component caused by the charge injection generated when the signal is sample-held by the holding unit 15 can be reduced.

If the amplification unit 14 is configured as an amplifier with variable amplification rate, the amplification rate of the amplification unit 14 may be switched according to an imaging condition and a sensitivity set by the imaging system. Moreover, according to this embodiment, in the AD conversion operation period, the holding capacitors Csh1 and Csh2 of the holding unit 15 are electrically disconnected from the amplification unit by turning off the switch hsw1. As a result, the pixel operation and the AD conversion operation period can be performed simultaneously, and high-speed readout can be realized. In the above-described embodiment, the operation of the photoelectric conversion apparatus 1 which performs the pixel operation and the AD conversion operation period simultaneously is exemplified, but the pixel operation and the AD conversion operation period may be performed sequentially.

(Operation of Horizontal 3-Column Cycle Weighted Adding Up or Weighted Averaging Mode in Amplification Unit)

A portion different from the non-adding up or non-averaging mode will be described by referring to FIG. 3. In the horizontal 3-column cycle non-weighted adding up or averaging mode in the amplification unit 14, the switches sw2 and sw3 of the amplification unit are turned off, while the switches sw1 and sw4 are turned on. As a result, the different pixel output lines are connected to each of the input capacitors Cin1, 2, and 3, respectively. That is, outputs from the three pixel output lines are input into the one differential amplifier OP. As described above, adding up or averaging in the non-weighted adding up or weighted averaging mode in the horizontal 3-column cycle in the amplification unit 14 is realized.

(Operation of Horizontal 2-Column Cycle Adding Up or Averaging Mode in Holding Unit)

Figure 9:
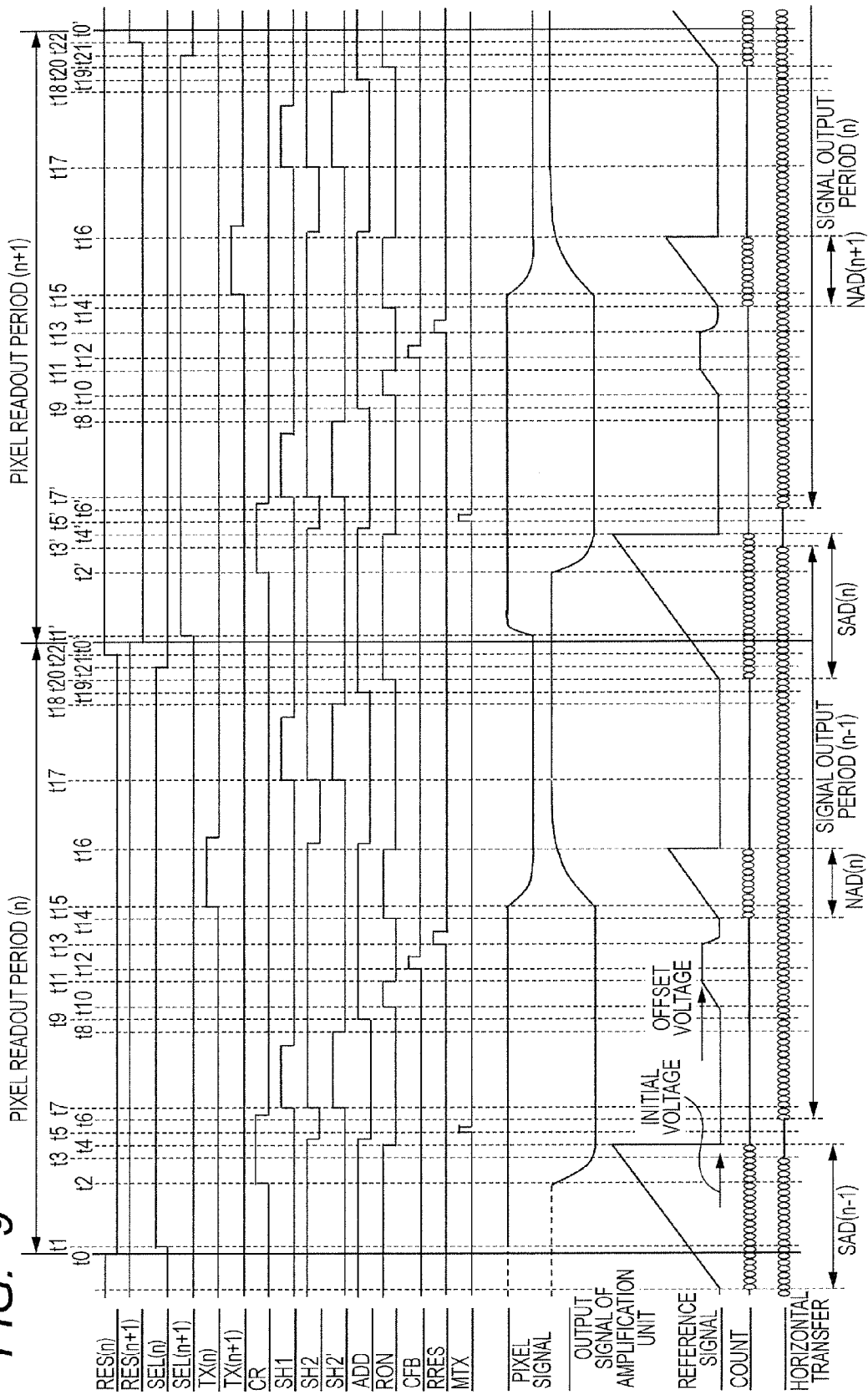
FIG. 9 is a timing chart for describing an operation of the photoelectric conversion apparatus.

A difference from the non-adding up or non-averaging mode will be described by referring to a timing chart in FIG. 9 and FIG. 5. The signals SH2 and SH2' are signals for controlling conduction states of the switches hsw2 and 3 of the holding unit 15. The signal ADD is a signal for controlling conduction states of the switches hsw4 and 5 of the holding unit 15.

In the horizontal 2-column cycle adding up or averaging mode in the holding unit 15, the holding units arranged on a lower side in FIG. 6 and corresponding to the odd-numbered pixels 2-1, 2-3, and 2-5 are assumed to be the holding units 15-1, 15-2, and 15-3, respectively. The switches hsw2 and 3 of the holding unit 15-2 are controlled by the signal SH2. Turning on/off of the switches hsw2 and 3 of the holding unit 15-1 and the holding unit 15-3 is controlled by the signal SH2'. Turning on/off of the switches hsw4 and 5 is controlled by the signal ADD.

The holding units arranged on an upper side in FIG. 6 and corresponding to the even-numbered pixels 2-4 and 2-6 are assumed to be the holding units 15-1 and 15-2, respectively. Turning on/off of the switches hsw2 and 3 of the holding unit 15-1 and the holding unit 15-2 is controlled by the signal SH2. Turning on/off of the switch hsw4 of the holding unit is controlled by the signal ADD. The switch hsw5 of the holding unit is controlled to be turned off at all the time in this mode.

An operation of the horizontal 2-column cycle adding up or averaging mode in the holding unit 15 will be described by referring to the timing chart in FIG. 9. Starting at time t7, the signals SH1, SH2, and SH2' temporarily rise to a high level, and an output of each of the amplification units 14 is held in the holding capacitors Csh1 and Csh2 of each of the holding units. After that, the signal SH2' falls to a low level at time t8, and the switches hsw2 and hsw3 are controlled to be turned off. At time t9, the signal ADD rises to a high level. At this time, in the holding unit connected to the odd-numbered pixel, the switches hsw4 and 5 are turned on. As a result, the holding capacitor Csh2 of the holding unit 15-1, the holding capacitors Csh1 and Csh2 of the holding unit 15-2, and the holding capacitor Csh1 of the holding unit 15-3 are connected, and the signals are subjected to adding up or averaging at a ratio of 1:2:1. In the holding unit connected to the even-numbered pixel, the switch hsw4 is turned on, the holding capacitors Csh1 and Csh2 of the holding unit 15-2 and the holding capacitor Csh1 of the holding unit 15-2 are connected, and the signals are subjected to adding up or averaging at a ratio of 2:2.

After that, at time t14, the signal RON rises to a high level, and the AD conversion operation (period NAD(n)) is performed. After the AD conversion operation period NAD(n), adding up or averaging of the pixel signal is performed by the similar flow similarly in a period from time t17 to t19, and then, the signal RON rises to a high level at time t20, and the AD conversion operation (period SAD(n)) is performed.

By means of the operations described above, adding up or averaging illustrated in FIG. 6 is realized. According to this embodiment, the photoelectric conversion apparatus which operates in the plurality of adding up or averaging modes with different adding up or averaging cycles while complication of a circuit configuration and a layout is reduced can be provided.

Second Embodiment

Figure 10:
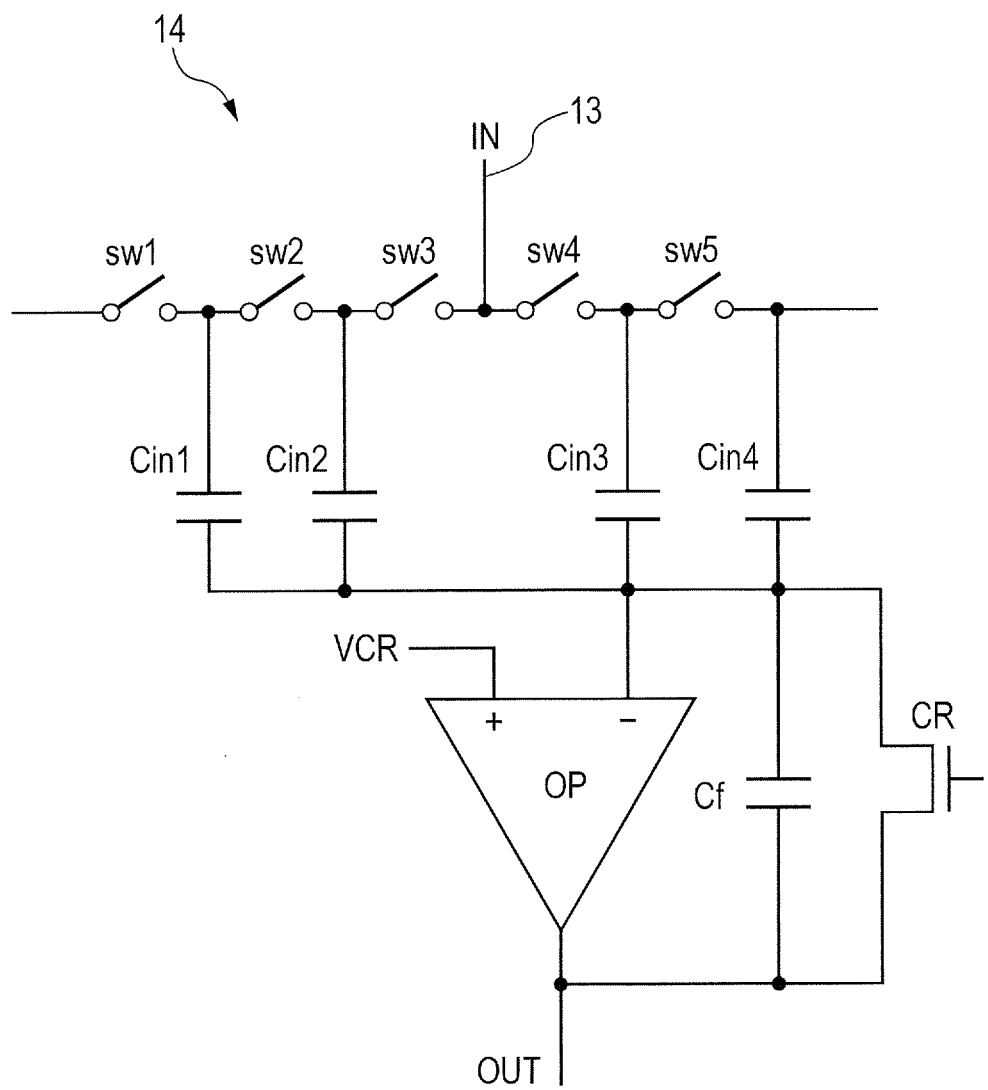
FIG. 10 is an equivalent circuit diagram illustrating a configuration of the amplification unit.

Cases in which the weighted adding up or weighted averaging in the amplification unit 14 and the non-weighted adding up or weighted averaging in the holding unit 15 are performed will be described below. By replacing the amplification unit 14 described as the first embodiment with a configuration illustrated in FIG. 10, the weighted adding up or weighted averaging of the horizontal 2-column cycle can be realized in the amplification unit.

By referring to FIG. 6 again, the adding up or averaging of this embodiment will be described. In the description below, in FIG. 6, the amplification units corresponding to the pixels 2-1, 3, and 5 of the column signal processing unit arranged on the lower side of each pixel are assumed to be the amplification units 14-1, 14-2, and 14-3, respectively.

In the amplification unit 14-1, the switches sw1 to sw5 are controlled to be turned on, in the amplification unit 14-2, the switches sw1, sw3, and sw4 are controlled to be turned on while the switches sw2 and sw5 are controlled to be turned off, and in the amplification unit 14-3, the switches sw1 to sw5 are controlled to be turned on. Then, signals from the pixel output lines corresponding to the pixels 2-1, 3, and 5 are input into the input capacitors Cin1 to 4 of the amplification unit 14-2 and subjected to adding up or averaging.

In this case, a ratio of the numbers of the holding capacitors to be connected is 1:2:1 with respect to the pixels 2-1, 3, and 5. Therefore, the weighted center of the signal in the horizontal direction is at a position of 2-B1. By means of the similar operation, the signals having the positions of 2-B2 and 2-B3 as the weighted centers in the horizontal direction are obtained.

The amplification units corresponding to the pixels 2-4 and 6 of the column signal processing unit arranged on the upper side of each pixel in FIG. 6 will be described by calling them the amplification unit 14-1 and the amplification unit 14-2, respectively.

In the amplification unit 14-1, the switches sw2, sw3, and sw5 are controlled to be turned on and the switches sw1 and sw4 to be turned off, and in the amplification unit 14-2, the switches sw1, sw2, and sw3 are controlled to be turned on, while the switches sw4 and sw5 are controlled to be turned off. Then, the signals from the pixel output lines corresponding to the pixels 2-4 and 6 are input into the input capacitors Cin1 to 4 of the amplification unit 14-1 and subjected to adding up or averaging. In this case, the number of the holding capacitors to be connected is 2:2 with respect to the pixels 2-4 and 6, respectively. Therefore, the weighted center of the signal in the horizontal direction is at the position of 2-T1 in FIG. 6. By means of the similar operation, the signals with the positions of 2-T2 and 2-T3 as the weighted centers in the horizontal direction are obtained.

Figure 11:
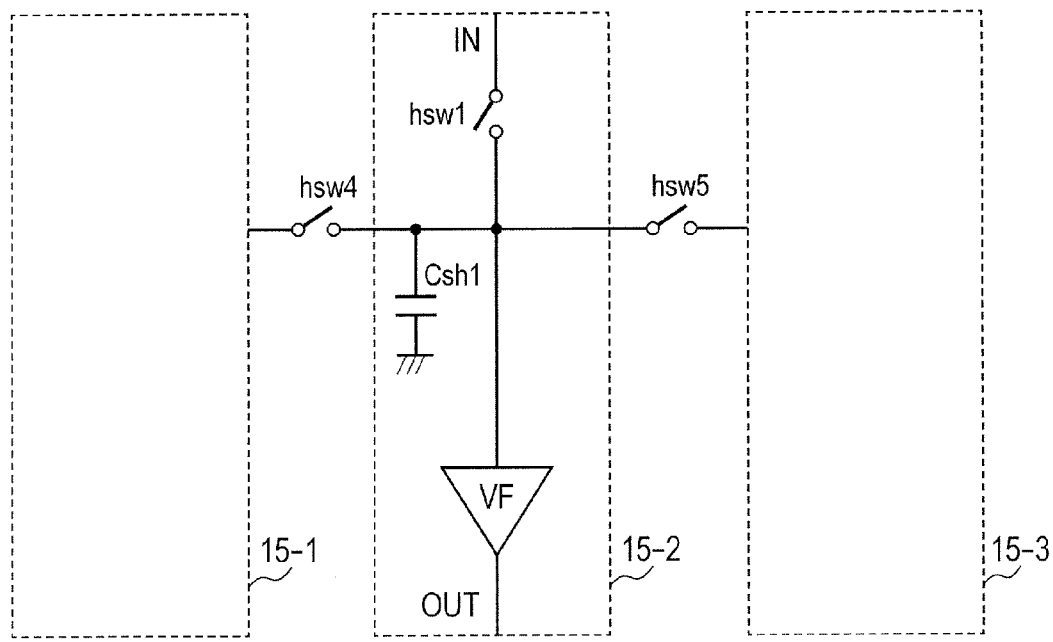
FIG. 11 is an equivalent circuit diagram illustrating a configuration of the holding unit.

Moreover, by configuring the holding unit illustrated in FIG. 5 as that illustrated in FIG. 11, horizontal adding up or averaging can be performed in the holding unit 15. In FIG. 11, the holding capacitor Csh1 of the holding unit 15-2 is connected to the holding capacitors of the adjacent holding unit 15-1 and holding unit 15-3 through the switches hsw4 and 5. In FIG. 11, by turning on the switches hsw4 and 5, the signal held in the holding capacitor Csh1 is subjected to adding up or averaging. The adding up or averaging in this case is the non-weighted adding up or weighted averaging of the horizontal 3-column cycle.

Third Embodiment

Figure 12:
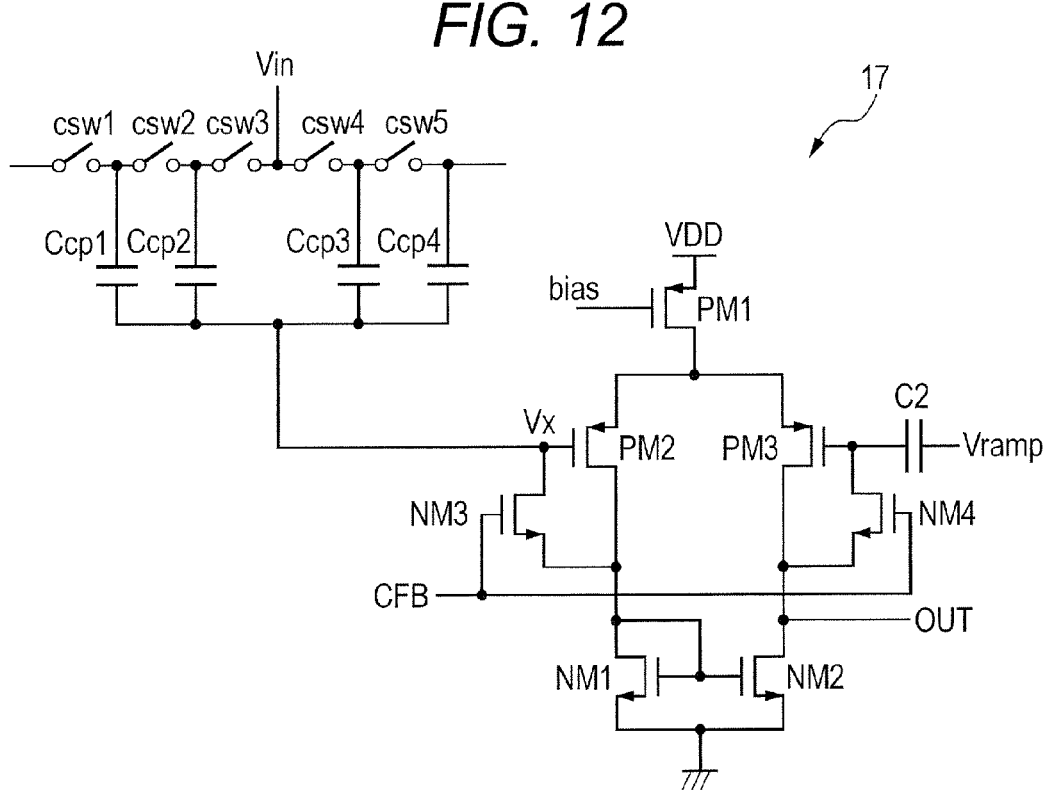
FIG. 12 is an equivalent circuit diagram illustrating a configuration of the comparing unit.

The column signal processing unit 4 of a third embodiment is configured to perform the non-weighted adding up or non-weighted averaging in the holding unit 15 and the weighted adding up or weighted averaging in the comparing unit 17. By configuring the holding unit 15 as illustrated in FIG. 11, the non-weighted adding up or non-weighted averaging can be performed. FIG. 12 illustrates a comparing unit performing the weighted adding up or weighted averaging of this embodiment. A difference from the comparing unit 17 illustrated in FIG. 7 is that the clamp capacitor C1 arranged between Vin and Vx is replaced with the switches csw1 to 5 and the clamp capacitors Ccp1 to 4. The arrangement of the switches csw1 to 5 and the clamp capacitors Ccp1 to 4 is similar to that of the switches sw1 to 5 of the amplification unit and the input capacitors Cin1 to 4 illustrated in FIG. 10. Thus, since the operation of the circuit is similar to the description in FIG. 10, description will be omitted. As a result, in the comparing unit 17, the weighted adding up or weighted averaging in the horizontal 2-column cycle can be realized.

Fourth Embodiment

Figure 13:
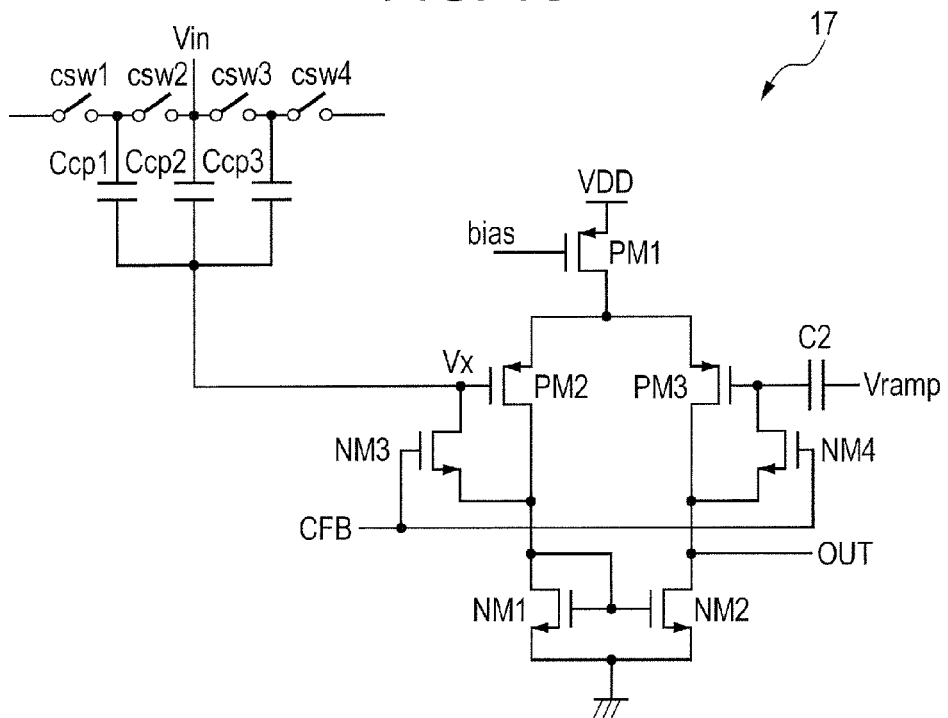
FIG. 13 is an equivalent circuit diagram illustrating a configuration of the comparing unit.

The column signal processing unit 4 in a fourth embodiment is configured to perform the weighted adding up or weighted averaging in the holding unit 15 and the non-weighted adding up or non-weighted averaging in the comparing unit 17. The holding unit 15 has the same configuration as that illustrated in FIG. 5. A configuration of the comparing unit of this embodiment is illustrated in FIG. 13. A difference from the comparing unit 17 illustrated in FIG. 7 is that the clamp capacitor C1 arranged between the Vin and Vx is replaced with the switches csw1 to 4 and the clamp capacitors Ccp1 to 3. Configurations of the switches csw1 to 4 and the clamp capacitors Ccp1 to 3 are similar to those of the switches sw1 to 4 and the input capacitors Cin1 to 3 illustrated in FIG. 3. Since the operation of the circuit is similar to that of the adding up or averaging in the amplification unit in the first embodiment, description will be omitted. As a result, the non-weighted adding up or non-weighted averaging in the horizontal 3-column cycle can be realized.

The third and fourth embodiments have the amplification unit 14 similarly to the first embodiment. However, it may be so configured that the amplification unit 14 is not provided, and the pixel output line 13 in FIG. 1 is directly connected to the input terminal of the holding unit 15. In this case, polarity of the signal held in the holding unit 15 is opposite to that in the first embodiment. By inverting polarity of the reference signal in the timing charts in FIGS. 8 and 9, the AD conversion operation can be performed similarly to that in the first embodiment.

In the first to fourth embodiments, the circuit configuration and method for performing the adding up or averaging in the weighted manner or in the non-weighted manner in the amplification unit 14, the holding unit 15, and the comparing unit 17 are described, but processing of the weighted adding up or weighted averaging is more preferably performed in a circuit on a subsequent stage of the amplification unit. The reason is as follows. In the weighted adding up or weighted averaging illustrated in FIG. 4 or FIG. 6, different operations are performed in the amplification unit 14 or the holding unit 15 of the column signal processing unit 4 arranged above and below the pixel 2. Because of that, there is a problem that a characteristic difference caused by offset or crosstalk is generated between the column signal processing units 4 arranged above and below. If the processing of the weighted adding up or weighted averaging is performed in the amplification unit 14, these characteristic differences are amplified by the amplification unit, and the characteristic differences are enlarged. Particularly, this problem becomes remarkable when a high amplification rate is set. Therefore, in the configuration in which the different operations are performed in the column signal processing units arranged above and below, the processing of the weighted adding up or weighted averaging is more preferably performed in the circuit on the subsequent stage of the amplification unit.

Fifth Embodiment

In the first to fourth embodiments, it was described that the adding up or averaging in the horizontal 2-column cycle and the horizontal 3-column cycle can be performed in the amplification unit 14, the holding unit 15, and the comparing unit 17. By combining them as appropriate, a configuration in which a plurality of the horizontal adding up or averaging modes with different adding up or averaging cycles are combined can be provided.

Sixth Embodiment

In the first to fifth embodiments, the examples of the configurations for realizing the plurality of horizontal adding up or averaging modes with different adding up or averaging cycles are described. A plurality of methods for performing adding up or averaging or skipping in the vertical direction in addition to the adding up or averaging in the horizontal direction in the same cycle as the cycle of the horizontal adding up or averaging mode in each of the embodiments will be described.

(Adding Up or Averaging by Simultaneous Selection of Plural Rows)

By simultaneously selecting a plurality of rows in the vertical scanning unit 7, the select transistors SEL of the pixels 2 in the plurality of rows are simultaneously turned on. In this case, the voltage signal output to the pixel output line 13 is a voltage obtained by averaging those output from the selected pixels 2 in the plurality of rows. Thus, by simultaneously selecting the plurality of rows, an output of the adding up or averaging of the pixel signal in the vertical direction can be obtained. By configuring such that the select transistors SEL in three rows are turned on simultaneously in the horizontal 3-column cycle adding up or averaging mode in any one of the first to fifth embodiments, an image of 3×3 pixel cycle can be obtained.

In FIG. 8, the explanation was made that the reference character (n) means the pixel readout period and driving of the n-th pixel rows of the signal RES, the signal SEL, and the signal TX. In the timing chart of simultaneous driving of the three rows in this embodiment, by replacing the reference character (n) with the reference characters (n, n+1, n+2) having the meaning of the 3-row simultaneous driving in FIG. 8, the reference character (n+1) corresponds to (n+3, n+4, n+5) after replacement. Moreover, the timing of the driving signal other than the transistor of the pixel unit is the same as that in FIG. 8.

Moreover, the timing chart in the adding up or averaging mode in the horizontal 2-column cycle corresponds to replacement of the reference characters (n) in the pixel readout period and the pixel rows of the signal RES, the signal SEL, and the signal TX with (n, n+1) and (n+1) with (n+2, n+3) in FIG. 8. An output of the adding up or averaging to the pixel output line 13 can be obtained by this 2-row simultaneous driving. After that, an image of the 2×2 pixel cycle can be obtained by the adding up or averaging in the horizontal 2-row cycle in any one of the first to fifth embodiments. By simultaneously driving the plurality of rows by the vertical scanning unit 7, images can be obtained at a high speed as compared with the readout by one row each.

(Row Skipping)

Similarly, by performing readout by skipping rows in the same cycle as the cycle of the horizontal adding up or averaging mode, the number of rows to be read out is reduced, and images can be obtained at a high speed. Specifically, if the cycle of the horizontal adding up or averaging mode is three columns, readout may be made every three rows. The timing chart in this case corresponds to the reference characters (n) of the pixel readout period and the pixel rows of the signal RES, the signal SEL, and the signal TX with (n) as they are and to replacement of (n+1) with (n+3) in FIG. 8.

(Adding Up or Averaging at Gate Node of Source Follower Transistor SF)

In FIG. 2, the gate nodes of the source follower transistors SF of the pixels 2 in the plural rows can be connected to each other through the transistor. The transistor functions as a switch for switching connection and disconnection between the gate nodes of the source follower transistors SF. By turning on the transistor, the gate nodes of the source follower transistors SF are connected between the plurality of pixels. At this time, since the charges accumulated in the gate node of the source follower transistors SF move and have the same potential, the potentials are averaged. As a result, the N signals and the (S+N) signals of the plural pixels can be subjected to adding up or averaging.

Seventh Embodiment

Figure 14:
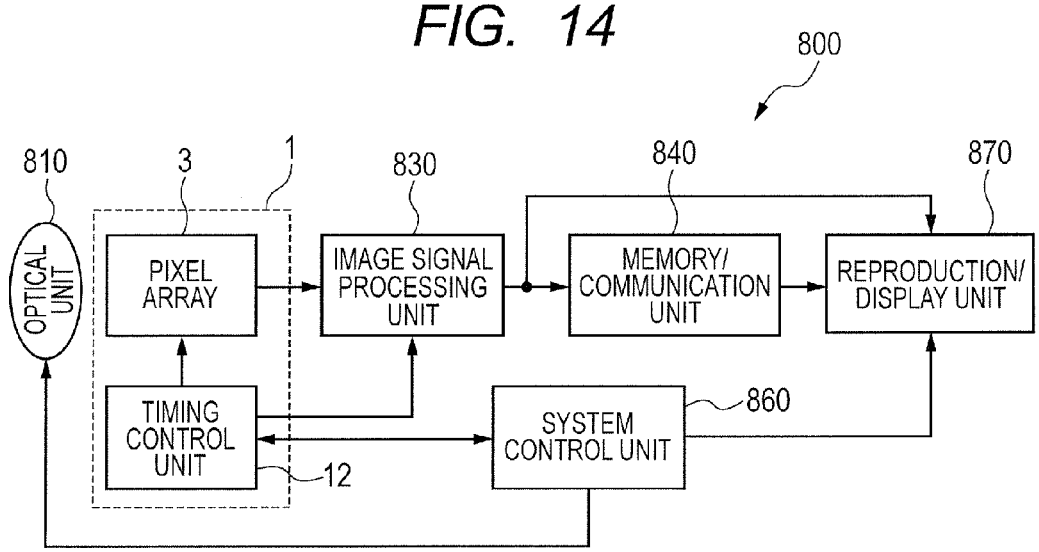
FIG. 14 is a block diagram illustrating a configuration of an imaging system.

FIG. 14 is a view illustrating a configuration of an imaging system using the photoelectric conversion apparatus 1 according to the first to sixth embodiments of the present invention. An imaging system 800 includes the photoelectric conversion apparatus 1, an optical unit 810, an image signal processing unit 830, a memory/communication unit 840, a system control unit 860, and a reproduction/display unit 870. The photoelectric conversion apparatus 1 includes the pixel array 3 and the timing control unit 12 as described above.

The optical unit 810 which is an optical system such as a lens forms an image of light from the object on the plurality of pixels 2 of the pixel array 3 and forms an image of the object. The pixel array 3 outputs a signal according to the light having formed the image on the pixels 2 at the timing based on the signal from the timing control unit 12. The signal output from the pixel array 3 is input into the image signal processing unit 830 after being subjected to processing such as AD conversion. The image signal processing unit 830 executes signal processing such as conversion of the input signal to image data according to a method determined by a program. The signal obtained by the processing at the image signal processing unit 830 is sent as image data to the memory/communication unit 840. The memory/communication unit 840 sends a signal for forming an image to the reproduction/display unit 870 and allows a moving image or a still image to be reproduced/displayed by the reproduction/display unit 870. The memory/communication unit 840 also receives the signal from the image signal processing unit 830 and communicates with the system control unit 860 and also performs an operation of recording a signal for forming an image on a recording medium, not shown.

The system control unit 860 is to integrally control the operation of the imaging system 800 and controls driving of the optical unit 810, the timing control unit 12, the memory/communication unit 840, and the reproduction/display unit 870. Moreover, the system control unit 860 includes a storage device, not shown, which is a recording medium, for example, and a program required for controlling the operation of the imaging system 800 is recorded therein. Moreover, the system control unit 860 supplies a signal for switching a driving mode according to an operation of a user, for example, into the imaging system. Specifically, signals for changing a row to be read out or a row to be reset, changing a view angle with electronic zooming, and switching such as shifting of a view angle with electronic vibration isolation are supplied. The timing control unit 12 controls driving timing of the pixel array 3 and the image signal processing unit 830 based on the control by the system control unit 860.

The photoelectric conversion apparatus 1 according to this embodiment can realize a plurality of the adding up or averaging modes with different adding up or averaging cycles. Therefore, by mounting the photoelectric conversion apparatus 1 according to this embodiment, the imaging system 800 capable of adjustment of a frame rate or an image quality can be realized by changing the adding up or averaging cycle of the pixel according to a situation such as an imaging scene.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-023367, filed Feb. 10, 2014, which is hereby incorporated by reference herein in its entirety.

What is claimed is:

1. A photoelectric conversion apparatus comprising:
a pixel array in which a plurality of pixels is arranged in a matrix;
a plurality of pixel output lines, each of the plurality of pixel output lines being provided according to a corresponding column of the pixel array and transmitting a pixel signal output from a pixel of the pixel array;
a plurality of column signal processing units, each of the plurality of column signal processing units being provided according to the corresponding column of the pixel array and into which the pixel signal is input from the pixel output line;
a first adding up or averaging unit configured to add up or average the plurality of pixel signals output to the plurality of pixel output lines corresponding to different columns of the pixel array; and
a second adding up or averaging unit, arranged at a subsequent stage of the first adding up or averaging unit, configured to add up or average the plurality of pixel signals output to the plurality of pixel output lines corresponding to different columns of the pixel array, wherein
between the first adding up or averaging unit and the second adding up or averaging unit, cycles of the columns from which added up or averaged signals are output are different from each other.

2. A photoelectric conversion apparatus comprising:
a pixel array in which a plurality of pixels is arranged in a matrix;
a plurality of pixel output lines, each of the plurality of pixel output lines being provided according to each column of the pixel array and transmitting a pixel signal output from a pixel of each column of the pixel array; and
a plurality of column signal processing units, each of the plurality of column signal processing units being provided according to each column of the pixel array and into which the pixel signal is input from the pixel output line, wherein
a column signal processing unit of the plurality of column signal processing units has a plurality of horizontal adding up or averaging units configured to add up or average the plurality of pixel signals based on the pixels of different columns of the pixel array, an amplification unit having a plurality of input capacitors, and a holding unit including a plurality of holding capacitors in which an output signal of the amplification unit is held,
a plurality of adding up or averaging modes with different numbers of columns subjected to adding up or averaging can be selected by selectively using one or a plurality of the plurality of horizontal adding up or averaging units,
the plurality of horizontal adding up or averaging units includes a unit configured to perform horizontal adding up or averaging by switching connection with the plurality of input capacitors and the plurality of pixel output lines, and
the plurality of horizontal adding up or averaging unit includes a unit configured to perform horizontal adding up or averaging by switching connection with the plurality of holding capacitors and an output of the amplification unit.

3. The photoelectric conversion apparatus according to claim 1, wherein the column signal processing unit comprises an amplification unit,
the first adding up or averaging unit is configured to add up or average a signal that is input to the amplification unit from the plurality of pixel output lines corresponding to different columns, and
the second adding up or averaging unit is configured to add up or average a signal that is output from a plurality of the amplification units corresponding to different columns.

4. The photoelectric conversion apparatus according to claim 3, wherein the first adding up or averaging unit comprises a plurality of switches connected between the respective pixel output lines in series, and
the amplification unit comprises a plurality of input capacitors, each of the plurality of input capacitors being connected to a node between the plurality of switches.

5. The photoelectric conversion apparatus according to claim 4, wherein the amplification unit is configured to change an amplification rate of the amplification unit by changing a number of input capacitors connected to an input terminal of the amplification unit by controlling the plurality of switches.

6. The photoelectric conversion apparatus according to claim 3, wherein the column signal processing unit further comprises a holding unit including a plurality of holding capacitors in which an output signal of the amplification unit is held, and
the second adding up or averaging unit is configured to switch connection between a plurality of output terminals of the plurality of amplification units corresponding to different columns and a plurality of the holding capacitors.

7. The photoelectric conversion apparatus according to claim 6, wherein the second adding up or averaging unit comprises a plurality of switches connected between the respective output lines of the plurality of amplification units in series, and
each of the plurality of holding capacitors are connected to a node between the plurality of switches.

8. The photoelectric conversion apparatus according to claim 1, wherein the column signal processing unit comprises a holding unit including a plurality of holding capacitors each holding the pixel signal, and a comparator configured to compare the input pixel signal with a reference signal and output a signal indicating a comparison result,
the comparator comprises a differential amplifier, and a plurality of clamp capacitors connected between an input terminal of the differential amplifier and an input terminal of the comparator,
the first adding up or averaging unit is configured to switch connection between the plurality of pixel output lines corresponding to different columns and the plurality of holding capacitors, and the second adding up or averaging unit is configured to switch connection between a plurality of output terminals of the plurality of holding units and the plurality of the clamp capacitors.

9. The photoelectric conversion apparatus according to claim 1, wherein at least one of the first adding up or averaging unit and the second adding up or averaging unit is configured to add up or average the plurality of pixel signals at different ratios.

10. The photoelectric conversion apparatus according to claim 1, wherein the first adding up or averaging unit and the second adding up or averaging unit are further configured to be operable in a non-adding up or non-averaging mode for outputting without adding up or averaging the pixel signal.

11. The photoelectric conversion apparatus according to claim 1, wherein the pixel signal read out from each column of the pixel array is a pixel signal subjected to adding up or averaging in the pixel output line in each column by simultaneously driving the plurality of rows of the pixel array.

12. An imaging system having a photoelectric conversion apparatus comprising:
   a pixel array in which a plurality of pixels is arranged in a matrix;
   a plurality of pixel output lines, each of the plurality of pixel output lines being provided according to a corresponding column of the pixel array and transmitting a pixel signal output from a pixel of the pixel array;
   a plurality of column signal processing units, each of the plurality of column signal processing units being provided according to the corresponding column of the pixel array and into which the pixel signal is input from the pixel output line;
   a first adding up or averaging unit configured to add up or average the plurality of pixel signals output to the plurality of pixel output lines corresponding to different columns of the pixel array; and
   a second adding up or averaging unit, arranged at a subsequent stage of the first adding up or averaging unit, configured to add up or average the plurality of pixel signals output to the plurality of pixel output lines corresponding to different columns of the pixel array, wherein
   between the first adding up or averaging unit and the second adding up or averaging unit, cycles of the columns from which added up or averaged signals are output are different from each other, and
   an image signal processing unit configured to execute processing of a signal output from the photoelectric conversion apparatus.

* * * * *